(12) United States Patent
Singh

(10) Patent No.: US 6,215,927 B1
(45) Date of Patent: Apr. 10, 2001

(54) SENSING TAPES FOR STRAIN AND/OR TEMPERATURE SENSING

(75) Inventor: Harmeet Singh, Simsbury, CT (US)

(73) Assignee: Minnesota Mining & Maufacturing Company, St. Paul, MN (US)

( * ) Notice: Subject to any disclaimer, the term of this patent is extended or adjusted under 35 U.S.C. 154(b) by 0 days.

(21) Appl. No.: 09/084,842

(22) Filed: May 26, 1998

(51) Int. Cl.[7] .................................................. G02B 6/34
(52) U.S. Cl. ............................................................ 385/37
(58) Field of Search ........................... 385/36, 37, 147, 385/114, 12, 13; 250/227.14, 227.15, 227.16; 356/73.1

(56) References Cited

U.S. PATENT DOCUMENTS

| | | | |
|---|---|---|---|
| 4,649,529 | * 3/1987 | Avicola | 367/149 |
| 4,806,012 | 2/1989 | Meltz et al. | 356/32 |
| 5,351,324 | 9/1994 | Forman | 385/37 |
| 5,355,208 | 10/1994 | Crawford et al. | 356/35.5 |
| 5,723,857 | * 3/1998 | Underwood et al. | 250/277.14 |

FOREIGN PATENT DOCUMENTS

| | | | |
|---|---|---|---|
| 0 384 649 A2 | 8/1990 | (EP) | G01D/5/26 |
| WO 98/12525 | 3/1998 | (WO) | G01L/1/24 |

OTHER PUBLICATIONS

Claus et al., "Embedded Optical Fiber Sensors for Materials Evaluation", Journal on Nondestructive Evaluation, Jun. 8, 1989, vol. 8, No. 2, New York, US, pp. 135–145.

A.M. Vengsarker et al., "Long–Period Fiber Gratings as Band–Rejection Filters", IEEE Journal of Lightwave Technology, vol. 14, No. 1, Jan. 1996, pp. 58–65.

P. A. Robertson and B. P. Ludden, "A Fibre Optic Distributed Sensor System for Condition Monitoring of Synthetic Ropes", Ref. No. 1997/033, IEE Colloquium on Optical Techniques for Smart Structures and Structural Monitoring, Feb. 17, 1997, pp. 12/1—12/6.

* cited by examiner

Primary Examiner—Akm E. Ullah
(74) Attorney, Agent, or Firm—Fish & Richardson P.C.

(57) ABSTRACT

A tape to be mounted on a workpiece includes an elongated support ribbon and an optical fiber attached to the support ribbon.

19 Claims, 3 Drawing Sheets

SENSING TAPES FOR STRAIN AND/OR TEMPERATURE SENSING

BACKGROUND OF THE INVENTION

The invention relates generally to optical waveguides and more specifically to optical fibers.

Optical fibers are used to guide light which might, typically, be an optical signal used in telecommunications or in sensing applications. Some optical fibers can be described as a thin strand of light-transmitting medium. In general, an optical fiber includes an inner core and an outer cladding having an effective index of refraction less than the inner core. Some optical fibers, however, have a complex structure made from an inner core surrounded by several outer cores, or claddings, each having different effective indices of refraction. The difference in the effective index of refraction creates internal reflections forcing the light to propagate along the inner core and preventing it from leaking out of the fiber.

Some optical fibers include Bragg gratings (BG). A Bragg grating is formed by producing a series of perturbations in the index of refraction of the inner core. Typically, the perturbations are formed by exposing the core through the cladding to an interference pattern of two ultraviolet beams directed against the optical fiber. The spacing of the perturbations creates a grating characterized by a center wavelength at which light will no longer propagate through the optical fiber. Bragg gratings with different perturbation spacings have different center wavelengths. In general, Bragg gratings are classified either as short period gratings or as long-period gratings. Long-period gratings are those in which the spacing of the perturbations is at least 10 times larger than the wavelength of input light. Typically, the period is in the range 15–1500 $\mu$m for center wavelengths between 700 and 1500 nm. In addition, long-period gratings can have a span of perturbations extending for a few cm. On the other hand, short period gratings have a span of a few 100 microns to several cm and a period in the range 0.2–0.7 $\mu$m for center wavelengths between 600 and 2100 nm.

Bragg gratings are used in optical fibers to filter out selected wavelengths from an optical signal, e.g., like a notch filter. As an optical signal propagates through the core and encounters a short period grating, specific wavelengths of light, which corresponds to the resonant or center wavelength of the grating, are reflected back along the inner core. When an optical signal encounters a long-period grating, the center wavelength of the grating is converted from a guided mode of the core to a non-guided mode of the cladding. A guided mode propagates through the core of the optical fiber. A non-guided mode of the cladding dissipates through the cladding and does not propagate through the optical fiber. The center wavelength reflection or conversion from a guided mode to a non-guided mode is a function of the perturbation spacing of the Bragg grating. The center wavelength of the Bragg grating is sensitive to strain and temperature. Strain and/or change in temperature causes the center wavelength to shift. Typically, for a long-period grating a central wavelength of 1550 nm shifts by about 1 to 1.5 nm per 100° C. change in temperature and by about 0.12 nm per 100 microstrain change in strain.

SUMMARY OF THE INVENTION

In general, in one aspect, the invention features a tape to be mounted on a workpiece. The tape includes an elongated ribbon and an optical waveguide (e.g. optical fiber) supported by the elongated ribbon.

The optical fiber can be attached along the elongated direction of the elongated ribbon. The optical fiber can include a Bragg grating and an outer coating. The outer coating can have a thickness and flexibility chosen to isolate substantially the optical fiber from the workpiece. The outer coating also can have a thickness and flexibility chosen to allow effective transfer of strain from the workpiece to the optical fiber. The outer coating can be a polyamide. The optical fiber also can include a plurality of Bragg gratings.

In another aspect, the invention features a tape to be mounted on a workpiece. The tape includes an elongated ribbon, a first optical fiber supported by the elongated ribbon, and a second optical fiber supported by the elongated ribbon.

The first and second optical fibers can be attached along the elongated direction of the elongated ribbon. The first and second optical fibers can include a Bragg grating. The first optical fiber also can include a first coating. The first coating can have a thickness and flexibility chosen to isolate substantially the first optical fiber from the workpiece. The second optical fiber also can include a second coating. The second coating can have a thickness and flexibility chosen to allow transfer of strain from the workpiece to the second optical fiber.

In another aspect, the invention features a method of producing a tape. The method includes providing a coated optical fiber and supporting the optical fiber with an elongated ribbon.

The step of supporting the optical fiber can include a step of attaching the optical fiber along the elongated direction of the elongated ribbon. The step of providing a coated optical fiber can include a step of coating an optical fiber with coating.

The invention provides a sensing tape by embedding a coated optical fiber into a support ribbon. The sensing tape is easily attached to a support structure to monitor strain and/or temperature. Also, the tape can be easily packaged by simply winding the tape onto a spool from which the desired amount of tape can be unwound at the time of installation and/or use.

DESCRIPTION OF THE PREFERRED EMBODIMENTS

The sensing tapes discussed herein are used to monitor or detect changes in strain and/or temperature. In general, sensing tapes include an optical fiber embedded in or mounted on a flexible elongated support ribbon.

Figure 1:
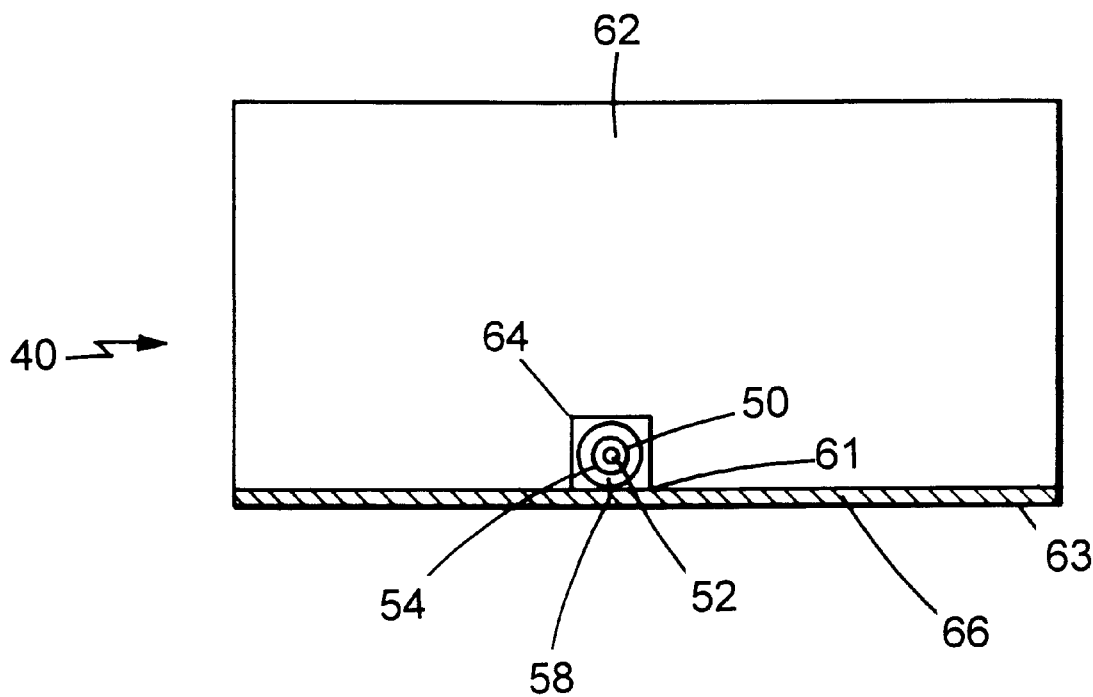
FIG. 1 illustrates a sensing tape for measuring strain and temperature.

Referring to FIG. 1, sensing tape 40 which senses both strain and temperature includes an optical fiber 50 held into a longitudinal groove 61 of a support ribbon 60 by an epoxy 64, e.g., TRA Bond-F118 epoxy from TRA-CON, located in Bedford, Mass. Optical fiber 50 includes an outer cladding 54 and an inner core 52 having a Bragg grating (not shown). Outer cladding 54 is coated with a coating 58 designed to allow effective strain transfer from the support ribbon 60 to the optical fiber 50. The effective transfer of strain is a function of the thickness and flexibility of the coating. The flexibility of the coating is characterized by an elasticity modulus. A typical sensing tape used for sensing both strain and temperature includes an optical fiber having a thin coating of an inelastic polymer, e.g., 25 micron polyimide coated fiber, a 115 micron thick cladding of glass, e.g., $SiO_2$, and a 10 micron thick core of glass, e.g., $SiO_2$. The core also can be doped with other materials, e.g. germanium. The coating material can be made from similar materials, e.g., polymers, having a suitable thickness and flexibility. As a general rule, a thicker coating of a material attenuates the amount of strain transferred more than a thinner coating of the same material. In practice, the coating material is designed to be thin and inelastic such that the effects of strain transferred through the epoxy 64 to optical fiber 50 are not substantially attenuated. For example, the coating is selected such that the transfer of strain is attenuated by less than 5%. A bonding layer 66 covers a groove side 61 of support ribbon 60 and is used to attach sensing tape 40 to the structure being monitored, e.g., a support beam of a bridge or an airplane wing.

Once mounted to a structure, changes in strain and temperature are transferred from the structure to optical fiber 50, i.e., through bonding epoxy 64 to optical fiber 50. Strain and temperature changes transferred to the optical fiber cause the center wavelength of the Bragg grating to shift. The shift of the center wavelength of a Bragg grating is a function of both strain and change in temperature. Therefore, both strain and change in temperature transferred from the support structure to the optical fiber can be sensed by monitoring the shift of the center wavelength.

The response of the center wavelength is expressed by Eq. 1

$$\Delta\lambda = \lambda(\eta\epsilon + \xi\Delta T) \quad (1)$$

where $\Delta\lambda$ is the wavelength change caused by strain ($\epsilon$) and change in temperature ($\Delta T$). $\lambda$ is the center wavelength of the grating at room temperature and zero applied strain. $\eta$ is the strain-optic coefficient and $\xi$ is the temperature coefficient. The value of the strain-optic coefficient and the value of the temperature coefficient depends upon the geometry and materials used in optical fiber fabrication. Each optical fiber possess an unique set of strain-optic and temperature coefficients. For a single mode fiber made from $SiO_2$, $\eta$ is typically about 0.75–0.80 microstrain$^{-1}$. $\xi$ is typically about $6-8\times10^{-6}$ $C.^{-1}$.

If sensing tape 40 is placed in a constant temperature environment, then the change in center wavelength can be attributed to strain alone. That is, since $\Delta T=0$, the second term in the right hand side of Eq. 1, $\lambda\xi\Delta T$, is also zero and Eq. 1 can be rewritten as:

$$\Delta\lambda = \lambda\eta\epsilon \quad (2)$$

Conversely, if sensing tape 40 is placed in an environment in which it is known that there is no strain, then the change in center wavelength can be attributed to $\Delta T$ alone. That is, since $\epsilon=0$, the first term in the right-hand side of Eq. 1, $\lambda\epsilon\Delta$, is also zero and Eq. 1 can be rewritten as:

$$\Delta\lambda = \xi\Delta T \quad (3)$$

Figure 2:
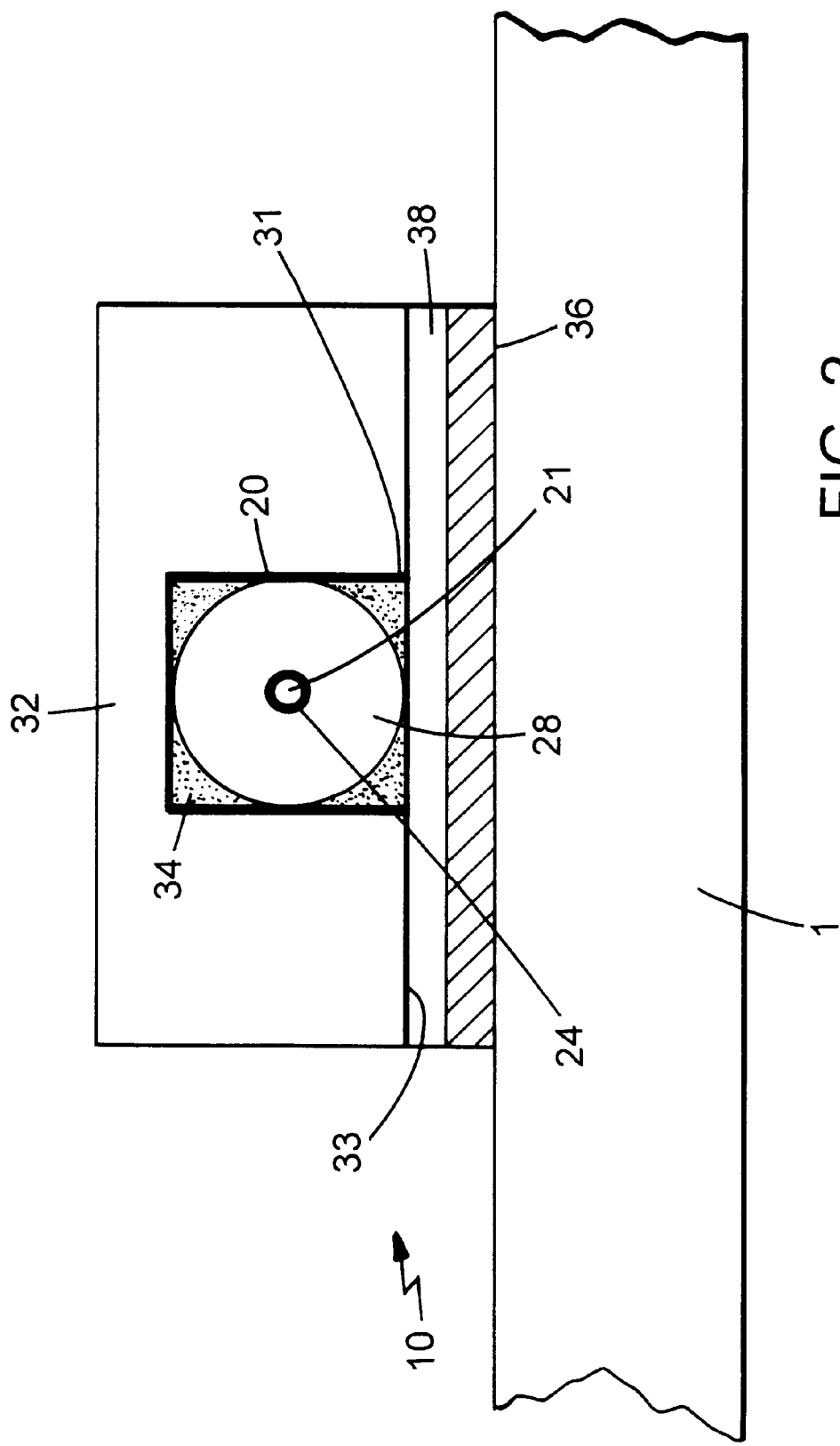
FIG. 2 illustrates a sensing tape for measuring temperature.

In some sensing applications, where both strain and temperature changes are present, it may be desirable to sense only change in temperature. Referring to FIG. 2, a sensing tape 10, which senses only change in temperature, includes an optical fiber 20 held in a longitudinal groove 31 of a support ribbon 32 by epoxy 34, e.g., a soft silicon rubber based epoxy, such as Dow Corning's gasket sealant which has very low stiffness. As before, optical fiber 20 includes an outer cladding 24 and an inner core 21 having a Bragg grating (not shown). Outer cladding 24 is coated with a coating 28 designed to substantially isolate optical fiber 20 from strains experienced by the structure to which support ribbon 32 is attached. The amount of isolation, and thus the attenuation in strain transfer to the optical fiber, is dictated by the thickness and flexibility of coating 28. The thicker and more flexible the coating, the more effective the isolation will be. Thus, it can be assumed that the changes in center wavelength that are observed in a fiber will be due to changes in temperature and not due to strain associated with the structure being monitored.

A typical sensing tape used for sensing change in temperature uses a thick coating of an elastic polymer, e.g., a 600 micron acrylate coating. As described above, the coating can be made from a wide range of materials. In general, it is desirable to select the thickness and elasticity of the coating so as to attenuate substantially the strain transferred through the epoxy 34 to optical fiber 20 so that the observed changes in the center wavelength are due to changes in temperature of the structure being monitored. For example, the thickness and elasticity of the coating are selected so as to attenuate the strain transfer by a factor of at least 10. In practice, the factor necessary to attenuate the strain transfer is related to the magnitude of the change in strain on the structure being monitored. For example, in sensing applications where large changes in strain are present, the thickness and elasticity of the coating are selected so as to attenuate the strain transfer by a factor that is greater than 10.

Referring to FIG. 2, a sealing layer 38 hermetically seals a groove side 33 of support ribbon 30 and prohibits foreign species, e.g., air, biological species, and chemical species, from interacting with coating 28. A bonding layer 36 covers sealing layer 38 and is used to attach the temperature sensing tape 10 to a support structure 1.

By properly selecting the thickness and flexibility of the epoxy, the bonding layer, and the support ribbon also one can further isolate the fiber from stain.

As seen in Eq. 1, if the strain transfer is significantly attenuated so that $\lambda\eta\epsilon$ is approximately zero, then the observed changes in the center wavelength will be attributable to changes primarily in temperature as shown in Eq. 3.

Figure 3:
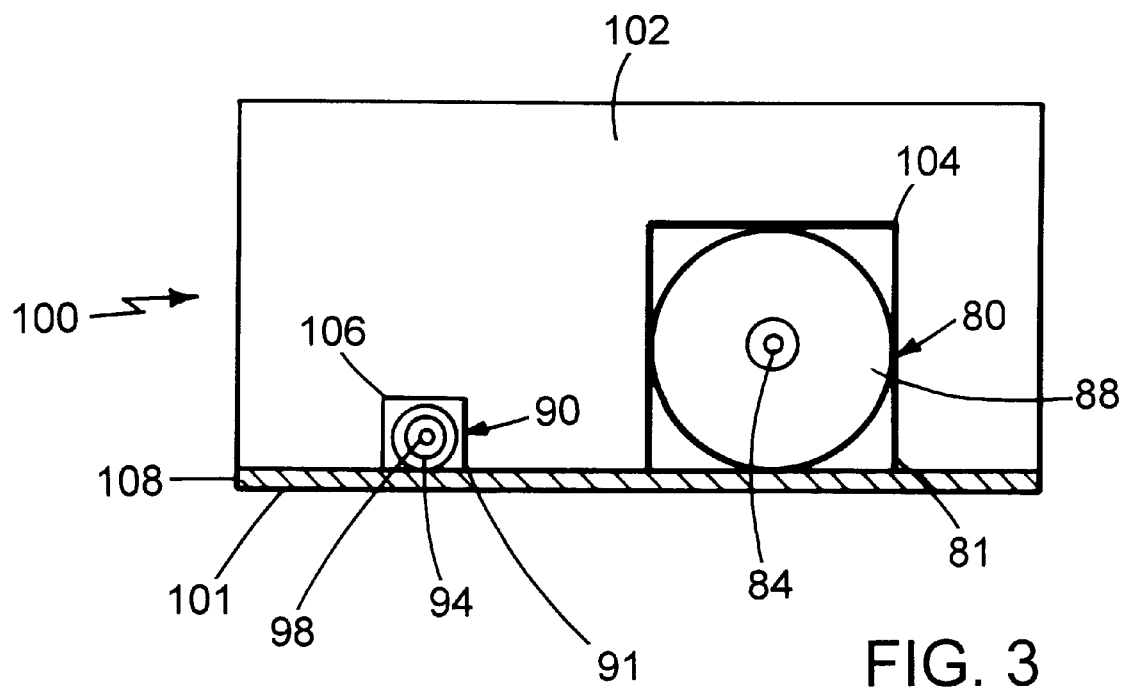
FIG. 3 illustrates a sensing tape for measuring strain.

In other sensing applications, where both strain and temperature changes are present, it may be desirable to sense only strain. Referring to FIG. 3, sensing tape 100 which can be used to sense changes in strain includes two optical fibers 80, 90. Optical fiber 90 is similar to the optical fiber as shown in FIG. 1. Optical fiber 80 is similar to the optical fiber as shown in FIG. 2. Optical fiber 80 is held in a first longitudinal groove 81 of support ribbon 102 by an epoxy 104. Optical fiber 90 is held in a second longitudinal groove 91 of support ribbon 102 by an epoxy 106. A bonding layer 108 covers a groove side 101 of support ribbon 102.

As described above, the thick and elastic coating on optical fiber 80 minimizes the amount of strain, $\lambda(\eta\epsilon)$, transferred to optical fiber 80 such that the center wavelength shift of the Bragg grating responds primarily to temperature, $\Delta\lambda = \lambda\xi\Delta T$. The thin and inelastic coating on optical fiber 90 allows strain transfer such that the center wavelength of the Bragg grating responds to the combined amount of strain and temperature, $\lambda(\eta\epsilon + \xi\Delta T)$. The center wavelength shift of optical fiber 80 is a measure of the change in temperature, $\Delta\lambda_{80} = \lambda\xi\Delta T$, and the center wavelength shift of optical fiber 90 is a measure of both strain and change in temperature, $\Delta\lambda_{90} = \lambda(\eta\epsilon + \xi\Delta T)$. The difference of the monitored change in center wavelengths is a direct measure of strain alone, as can be seen from the following:

$$\Delta\lambda_{90} - \Delta\lambda_{80} = \lambda\eta\epsilon \quad (4)$$

The sensing tapes described above can be used in a variety of sensing applications. For example, a temperature sensing tape can be used in an environment with constant temperature, e.g., probes used to detect oil and water wells, to monitor or detect acoustic signals. In addition, a sensing tape having a reactive coating can be used to detect the presence of chemical or biological species. For example, a chemical species can react with the coating to cause a change in the flexibility of the coating. The change in the flexibility of the coating affects the amount of strain transferred to the optical fiber which, in turn, affects the sensitivity of the center wavelength shift to changes in strain.

The optical fibers used in sensing tapes can include single mode optical fibers, in-line et al on optical fibers, intrinsic fabry-perot optical fibers, or any optical fiber having optical characteristics, e.g., a center wavelength shift or phase shift, affected by changes in strain and/or temperature. In addition, the optical fibers also can include several Bragg gratings each Bragg grating having the same or different a center wavelengths. In general, each Bragg grating is spaced apart by 2 inches to several hundred meters. Typically, span of each grating can be from 0.5 mm to several meters.

The optical fibers can be attached along the length of the support ribbon using any technique known to those skilled in the art. For example, an optical fiber can be embedded between two support ribbons. Alternatively, the optical fiber and support ribbon can be co-extruded simultaneously to produce an optical fiber embedded in a ribbon. In addition, the optical fiber can be attached to the top of a support ribbon. The support ribbon also can be wound into a helix, e.g., like a spring. An optical fiber can be attached along the elongated direction of the support ribbon before or after the support ribbon has been wound into a helix. Alternatively, an optical fiber can be supported by the support ribbon by winding the ribbon into a helix around the optical fiber. In this case, strain is not transferred from the support ribbon to the optical fiber, because the optical fiber is not attached to the support ribbon. The support ribbon can be any shape, such as, flat or round. For example, the support ribbon can be a round teflon tube. The optical fiber can be inserted into and attached within a central bore of the teflon tube. Alternatively, the teflon tube can be formed around the optical fiber. optionally, an optical fiber is supported by a teflon tube by inserting the optical fiber into a central bore of the tube. In this case, strain is not transferred from the teflon tube to the optical fiber because the optical fiber is not attached to the teflon tube. The support ribbon also can include a marking which indicates where the Bragg gratings are located. Once attached or embedded into the support ribbon, the sensing tape can be stored in a roll. During installation, the support ribbon can be unrolled and cut to a desired length.

The support ribbon also can include additional adhesives used to attach the ribbon to the support structure, e.g., a graphite composite epoxy which cures under applied pressure and heat. In addition, the support ribbon can include a paper backing applied to the bonding layer. During installation, the paper backing is removed and the sensing tape is attached to the support structure via the bonding layer.

Figure 4:
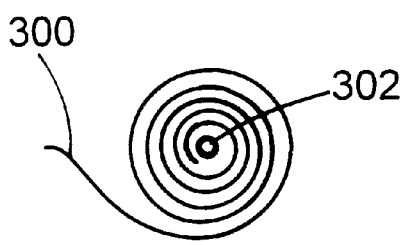
FIG. 4 shows a sensing tape wound on a support form.

Referring to FIG. 4, a convenient way of packaging and/or storing the sensing tape 300 is to wind it around a core 302 (e.g. a cylindrically shaped member) to form a compact reel of tape (e.g. like adhesive tape commonly found in office supply outlets). When sensing tape is needed for a particular application it is simply unwound from the reel or core and used. The remainder of unused tape remains conveniently wound on the core.

Other embodiments are within the following claims. For example, though we have described sensing tapes which incorporate optical fibers into or onto a ribbon structure, the invention covers the use of any optical waveguide on a ribbon structure including, for example, plastic fibers. Also, the tapes that are constructed in accordance with the invention can be used for purposes other than sensing. That is, the invention is meant to cover optical waveguides into a ribbon structure or any purpose including simply improving ease of applying or attaching such waveguides to workpieces. Also, the tape can be formed to have an adhesive surface or the adhesive can be supplied at the time of applying the tape to the workpiece.

What is claimed is:

1. A tape to be mounted on a workpiece, said tape comprising:

an elongated flexible ribbon; and an optical fiber supported by and affixed to the elongated ribbon along the elongated direction of the ribbon, wherein the optical fiber includes an outer coating having a thickness and flexibility chosen to substantially isolate the optical fiber from strains within the workpiece.

2. The tape of claim 1, wherein the optical fiber includes a Bragg grating.

3. The tape of claim 2, wherein the outer coating is a polyamide.

4. The tape of claim 1, wherein the optical fiber includes a plurality of Bragg gratings disposed along the length of the optical fiber.

5. The tape of claim 2, wherein said ribbon has a top surface and a botton surface, said tape further comprising an adhesive on said bottom surface.

6. The tape of claim 2, further comprising a core around which the ribbon and optical fiber are wound.

7. A tape to be mounted on a workpiece, said tape comprising:

an elogated flexible ribbon;

a first optical fiber supported by and affixed to the elongated ribbon along the elongated direction of the ribbon; and a second optical fiber supported by and affixed to the elongated ribbon along the elongated direction of the ribbon, wherein the first optical fiber includes a first coating of a first thickness and the second optical fiber includes a second coating of a second thickness and wherein the first thickness is greater than the second thickness.

8. The tape of claim 7, wherein the first optical fiber includes a Bragg grating.

9. The tape of claim 8, wherein the second optical fiber includes a Bragg grating.

10. The tape of claim 9, wherein the first coating has a thickness and flexibility chosen to substantially isolate the first optical fiber from strain in the workpiece.

11. The tape of claim 9, wherein the second coating has a thickness and flexibility chosen to allow effective transfer of strain from the workpiece to the second optical fiber.

12. The tape of claim 7, wherein said ribbon has a top surface and a bottom surface, said tape further comprising an adhesive on said bottom surface.

13. A method of producing a tape for mounting on a workpiece, said method comprising:
   providing a optical fiber with a coating having a thickness and flexibility chosen to substantially isolate the optical fiber from strains in the workpiece; and
   supporting the optical fiber on an elongated ribbon.

14. A method of claim 13, wherein the step of supporting the optical fiber includes attaching the optical fiber along the elongated direction of the elongated ribbon.

15. The tape of claim 9, wherein the first coating has a thickness and flexibility chosen to substantially isolate the first optical fiber from strain in the workpiece and wherein the second coating has a thickness and flexibility chosen to allow effective transfer of strain from the workpiece to the second optical fiber.

16. The tape of claim 7, wherein the first optical fiber includes a plurality of Bragg gratings disposed along the length of the first optical fiber and wherein the second optical fiber includes a plurality of Bragg gratings disposed along the length of the second optical fiber.

17. The tape of claim 16, wherein the first coating has a thickness and flexibility chosen to substantially isolate the first optical fiber from strain in the workpiece and wherein the second coating has a thickness and flexibility chosen to allow effective transfer of strain from the workpiece to the second optical fiber.

18. The tape of claim 17, wherein said ribbon has a top surface and a bottom surface, said tape further comprising an adhesive on said bottom surface.

19. The method of claim 13 further comprising:
   providing a second optical fiber with a coating having a thickness and flexibility chosen to allow effective transfer of strain from the workpiece to the second optical fiber; and
   supporting the second optical fiber on the elongated ribbon and in parallel with the first mentioned optical fiber.

* * * * *

UNITED STATES PATENT AND TRADEMARK OFFICE
CERTIFICATE OF CORRECTION

PATENT NO.    : 6,215,927 B1
DATED         : April 10, 2001
INVENTOR(S)   : Harmeet Singh It is certified that error appears in the above-identified patent and that said Letters Patent is hereby corrected as shown below:

<u>Column 3,</u>
Line 46, Equation "6-8 x $10^{-60}$ $C^{-1}$" should read -- 6-8 x $10^{-6}$ $°C^{-1}$ --.
Line 58, Equation "$\eta\epsilon\Delta$" should read -- $\lambda\eta\epsilon$ --.
Line 60, Equation "$\Delta\lambda = \xi\Delta T$" should read -- $\Delta\lambda = \lambda\xi\Delta T$ --

Signed and Sealed this

Sixteenth Day of April, 2002

Attest:

JAMES E. ROGAN
*Attesting Officer*   *Director of the United States Patent and Trademark Office*